United States Patent [19]
Foltz et al.

[11] Patent Number: 5,985,011
[45] Date of Patent: Nov. 16, 1999

[54] COMPOSITIONS AND PROCESSES FOR REMEDIATING HARDENED CEMENTITIOUS MATERIALS

[75] Inventors: Gary Earl Foltz, McAdenville; Hugh Hong Wang, Gastonia; David Brian Stokes, Shelby; Claudio Emilio Manissero, Maiden, all of N.C.

[73] Assignee: FMC Corporation, Philadelphia, Pa.

[21] Appl. No.: 09/150,593

[22] Filed: Sep. 10, 1998

Related U.S. Application Data

[62] Division of application No. 08/772,691, Dec. 23, 1996, Pat. No. 5,837,315
[60] Provisional application No. 60/012,947, Mar. 6, 1996.

[51] Int. Cl.$^6$ .......................... C04B 41/45; C04B 41/46; C04B 41/50
[52] U.S. Cl. ..................... 106/14.05; 106/14.11; 106/14.13; 106/14.14; 106/14.21; 106/14.41; 106/14.44; 106/819; 106/286.7
[58] Field of Search .............. 106/14.11, 14.21, 106/819, 14.13, 14.41, 14.44, 14.05, 286.7, 14.14

[56] References Cited

U.S. PATENT DOCUMENTS

| | | | |
|---|---|---|---|
| 4,006,030 | 2/1977 | Yoshida et al. | 106/12 |
| 4,442,021 | 4/1984 | Bürge et al. | 252/390 |
| 4,931,314 | 6/1990 | Takakura et al. | 427/140 |
| 5,560,773 | 10/1996 | Gimvang | 106/634 |
| 5,755,876 | 5/1998 | Stokes et al. | 106/739 |
| 5,803,960 | 9/1998 | Baxter | 106/711 |
| 5,810,921 | 9/1998 | Baxter et al. | 106/711 |
| 5,837,315 | 11/1998 | Foltz et al. | 427/136 |

FOREIGN PATENT DOCUMENTS

| | | |
|---|---|---|
| 0 398 356 | 11/1990 | European Pat. Off. . |
| 0 072 138 | 2/1993 | European Pat. Off. . |
| 7 033 556 | 2/1995 | Japan . |
| 2 271 123 | 4/1994 | United Kingdom . |

OTHER PUBLICATIONS

D.B. Stark et al., Eliminating or Minimizing Alkali–Silica Reactivity, Washington, D.C., National Research Council, Strategic Highway Research Program, SHRP–C–343, pp. 107–135 (1993), No Month.
Y. Sakaguichi et al., Proceedings, 8th International Conf., Alkali Aggregate Reaction, Kyoto, Japan; pp. 229–234 (1989), No Month.
Chemical Abstracts, vol. 120, No. 24, Jun. 13, 1994, Columbus, Ohio, US; abstract No. 305949c, XP000494068, see Abstract & Cem. Concr. Compos., vol. 15, No. 1–2, 1993, pp. 21–26, P.P. Hudec et al.: "Chemical treatments and additives for controlling alkali reactivity", No Month.
Patent Abstracts of Japan, vol. 017, No. 656 (M–1521), Dec. 6, 1993, & JP 05 214818 A (Railway Technical Res Inst; Others: 04), Aug. 24, 1993, see abstract & Database WPI Section Ch, Week 9338 Derwent Publications Ltd., London, GB; Class L02, AN 93–300140 see abstract, No Month.
Jawed, Int. Conf. Alkali–Aggregate React. Concr., 9th (1992), vol. 1, 471–6, No Month.
Hudec et al., Cem. Concr. Compos. (1993), 15(1–2), 21–6, No Month.
Wang et al., Mag. Concr. Res. (1995), 47 (170), 69–75, No Month.

Primary Examiner—Anthony Green
Attorney, Agent, or Firm—Alston & Bird LLP

[57] ABSTRACT

Compositions for controlling damage to cementitious materials as a result of alkali-silica reactions (ASR) are provided. The compositions include a lithium containing material and a surface active agent. The compositions are capable of effectively delivering lithium into a cementitious material after the composition is applied to a surface thereof. Processes for treating cementitious materials using the compositions are also provided.

16 Claims, No Drawings

COMPOSITIONS AND PROCESSES FOR REMEDIATING HARDENED CEMENTITIOUS MATERIALS

CROSS-REFERENCE TO RELATED APPLICATIONS

This application is a divisional application of Application Ser. No. 772,691, filed Dec. 23, 1996, now U.S. Pat. No. 5,837,315 which is related to commonly owned Provisional Application Ser. No. 60/012,947, filed Mar. 6, 1996.

FIELD OF THE INVENTION

This invention relates generally to processes for controlling deterioration of hardened cementitious materials, and more particularly for controlling deterioration of hardened cementitious materials from alkali-silica reactions (ASR).

BACKGROUND OF THE INVENTION

Concrete is a conglomerate of aggregate (such as gravel, sand, and/or crushed stone), water, and hydraulic cement (such as portland cement), as well as other components and/or additives. Concrete is generally fluidic when it is first made, enabling it to be poured or placed into shapes, and then later hardens, and is never again fluidic, in the general sense. Typically, moisture present in concrete is basic (that is, has a high pH). Concrete also typically includes alkali materials supplied by the cement, aggregate, additives, and even from the environment in which the hardened concrete exists (such as salts placed on concrete to melt ice).

Siliceous minerals can be present in certain aggregates found in concrete and mortars. Silica which is present in aggregates used to make concrete and mortars is subject to attack and dissolution by hydroxide ions present in basic solutions. Generally, the higher the pH (i.e., the more basic the solution), the faster the attack.

Different forms of silica show varying degrees of susceptibility to this dissolution. If there is sufficient alkali metal ion also present in this solution (such as sodium or potassium ions), the alkali metal ions can react with the dissolved silica and form an alkali-silica gel. Under certain conditions, the resultant alkali-silica gel can absorb water and swell. The swelling can exert pressures greater than the tensile strength of the concrete and thus cause the concrete to swell and crack. This process (hydroxide attack of silica, followed by reaction with alkali such as sodium and potassium) is referred to generally in the art as "alkali-silica reaction" or "ASR".

In the late 1930s and early 1940s, Stanton first identified the expansion and deterioration of portland cement-base concrete caused by ASR in the western part of the United States. T. E. Stanton, "Expansion of Concrete through Reaction between Cement and Aggregate," Proceedings of the Am. Soc. of Civil Engineers 66: 1781–1811 (1940). Since then, numerous structures have been reported as suffering from ASR in concrete around the globe.

ASR can weaken the ability of concrete to withstand other forms of attack. For example, concrete that is cracked due to this process can permit a greater degree of saturation and is therefore much more susceptible to damage as a result of "freeze-thaw" cycles. Similarly, cracks in the surfaces of steel reinforced concrete can compromise the ability of the concrete to keep out salts when subjected to de-icers, thus allowing corrosion of the steel it was designed to protect. Although rare, ASR can also cause the failure of concrete structures.

Since the discovery of ASR, researchers around the world have been trying to control this detrimental attack on the concrete structures. Prior attempts to control ASR include, for example, using cement with very low alkali content, non-reactive aggregate, and pozzolanic materials such as fly ash, silica fume, ground blast granulated furnace slag, zeolite minerals, thermally activated clay, and the like.

Lithium-based compounds have been shown to be effective in ASR inhibition by introducing these chemicals into concrete or mortar mix compositions. W. J. McCoy and A. G. Caldwell, "New Approach to Inhibiting Alkali-Aggregate Expansion," J.Amer.Concrete Institute, 22:693–706 (1951). However, this requires introducing the lithium-based compounds in the concrete or mortar mixture and does not address the problem of controlling or remediating ASR in existing hardened structures.

U.S. Pat. No. 4,931,314 is directed to a process for preventing a hardened cementitious material from deteriorating or for repairing a deteriorated cementitious material due to ASR. In this process, a cement paste, mortar or concrete with lithium nitrite incorporated therein is applied to an existing concrete system and allowed to harden. While stated to be effective in delivering lithium into the concrete structure, this process is time consuming and inconvenient or impractical because lithium nitrite is incorporated in a second cementitious layer applied to an already existing structure.

Expansion due to ASR in mortar bars and concrete prisms has reportedly been reduced by soaking the specimens in solutions of $LiNO_2$. See Y. Sakaguchi, et al., "The Inhibiting Effect of Lithium Compounds on Alkali-Silica Reaction," Proceedings, 8th International Conference, Alkali Aggregate Reaction, Kyoto, Japan: 229–234 (1989). However, soaking existing concrete structures in a $LiNO_2$ solution is difficult and not practical. Further, the effectiveness of this process is questionable in view of other studies indicating that solutions of other lithium compounds show very little penetration into existing hardened concrete structures, as described below.

The Strategic Highway Research Program (SHRP) publication SHRP-C-343 investigated a method of mitigating ASR in existing concrete by spreading lithium hydroxide solutions on the surface of the concrete. Difficulties were encountered, however, in effectively delivering the materials into concrete. SHRP also demonstrated that ASR can be reduced by soaking cementitious specimens in aqueous solutions of lithium carbonate, fluoride, and hydroxide. Again, however, such techniques are impractical in treating real life existing damaged concrete structures. Further, the effectiveness of this technique is questionable in view of the reported difficulties in effectively delivering lithium hydroxide into concrete by applying the solution onto an existing structure.

Because of these and other difficulties, processes have been developed to electrically drive lithium ions into concrete to mitigate ASR in concrete with conductive metals imbedded in the concrete. While lithium can be effectively delivered into a concrete structure electrically, such techniques typically require specialized equipment, careful maintenance and control of the electrolyte solution and equipment, and readily available utilities. In addition, these processes typically work only with concrete that contains reinforced steel (which is typically not found in highways) and can result in penetration only to the steel. Further, these processes may not work if the steel is coated (i.e., epoxy coated), which is increasingly common.

Problems can also arise in the repair of concrete materials when applying solutions onto and into large masses of concrete that may have substantial cracks, particularly when the bottom surface is not accessible because it is on or below another surface, such as the ground. Materials can pass through such cracks without being in contact long enough to penetrate the concrete mass itself.

SUMMARY OF THE INVENTION

The present invention provides novel compositions which can effectively penetrate into existing hardened cementitious materials. The compositions of the invention include lithium containing materials which can minimize and/or remediate ASR. The compositions advantageously also include an agent which is capable of assisting the delivery of lithium into the cementitious materials. In this embodiment of the invention, the compositions include an agent capable of reducing the surface tension of the composition, the presence of which can improve the penetration or delivery of lithium into hardened cementitious materials.

As discussed above, prior attempts to remediate existing hardened cementitious materials have been largely unsuccessful because of the inherent difficulties of delivering the ASR-remediating agent into a structure which is designed to prevent ingress of other substances. In contrast to prior attempts to remediate hardened cementitious materials, in the present invention, the compositions can be effectively delivered into hardened cementitious materials. Because an ASR-mitigating agent can be more effectively delivered into the hardened structure, the compositions of the invention can minimize or prevent ASR in hardened cementitious materials and/or remediate ASR-affected cementitious materials.

The invention also provides processes for minimizing ASR damage and/or remediating the deterioration of hardened cementitious materials as a result of ASR. In this aspect of the invention, a composition described above, which includes a lithium containing compound and advantageously a surface tension reducing agent, is applied to a surface of a hardened cementitious material. The composition can be applied to any suitable cementitious material, such as but not limited to cementitious materials in roads, buildings, bridges, and other applications in which cementitious materials are used. The composition can be applied, for example, by spraying, brooming on, ponding of solutions, and low pressure injection. Lithium present in the composition can effectively penetrate into the structure to which it is applied.

In a further aspect of this invention, polymerizable material and a composition as described above can be placed in cracks of a cementitious material. The polymerizable material is allowed to polymerize after application within the cementitious material to thereby increase the viscosity of the composition. As a result, the composition can be maintained within a desired internal area of the cementitious material without significant loss of the compositions due to run-off.

DETAILED DESCRIPTION OF THE INVENTION

Lithium containing materials useful in practicing the invention include, but are not limited to, organic and inorganic lithium salts, such as lithium nitrate, lithium sulphate, lithium citrate, lithium formate, lithium borate, lithium acetate, lithium meta- or tetraborate, lithium benzoate, lithium salts of simple carboxylic acids generally described by the formula RC(O)OH, wherein R is selected from the group consisting of alkyl, aryl, alkylaryl, arylalkyl, or cycloalkyl, and the like, lithium halides, such as lithium chloride, lithium bromide, lithium fluoride and the like, lithium hydroxide, lithium nitrite, lithium ortho- and metaphosphate, lithium aluminate, organolithium compounds generally described by the formula $R^1$-M, in which $R^1$ is alkyl, cycloalkyl, aryl, alkylaryl, arylalkyl, alkoxy, or $N'R^2R^3$, wherein each $R^2$ and $R^3$ can be hydrogen, alkyl, cycloalkyl, aryl, alkylaryl, arylalkyl, alkoxy, and M is lithium, such as methyllithium, butyllithium, phenyllithium, lithium hydroxyethoxide, lithium amide, and the like, and other low molecular weight lithium compounds suitable for contributing lithium ions in aqueous or organic solvent systems, and mixtures thereof.

As used herein, the term "alkyl" refers to C1 to C10 linear or blanched alkyl, such as, but not limited to, methyl, ethyl, propyl, butyl, isopropyl, n-butyl, s-butyl, t-butyl, pentyl, hexyl, and the like,. The term "aryl" as used herein refers to C6 to C10 cyclic aromatic groups such as phenyl, naphthyl, and the like and includes substituted aryl groups such as tolyl. The term "cycloalkyl" as used herein refers to C3 to C8 cyclic alkyl, such as cyclopropyl, cyclobutyl, cyclopentyl, cyclohexyl, and the like. The term "alkoxy" refers to C1 to C10 alkoxy. Other suitable lithium containing materials include materials which are capable of contributing lithium ions in solution (organic or inorganic solvents) in amounts sufficient to treat ASR.

The compositions of the invention also advantageously include one or more surface active agents. As used herein, the term "surface active agent" refers generally to agents capable of reducing the surface tension of liquids. Such agents are also known generally in the art also as surfactants. Various surface active agents can be used in the compositions of the invention, including cationic, anionic, nonionic, and amphoteric surfactants, and mixtures thereof. Exemplary surfactants include fluorocarbon anioric, cationic and nonionic surfactants, such as, but not limited to, amine perfluoroalkyl sulfonates, potassium fluorinated alkyl carboxylates, fluorinated alkyl quaternary ammonium iodides, fluorinated alkyl esters, and the like useful as surface active agents. Useful surfactants include fluorocarbon anionic, cationic and nonionic surfactants commercially available from 3M as the Fluorad® series of surfactants, such as FC-95, FC-98, FC-99, FC-120, FC-129, FC-135, FC-430, and FC-431.

The composition can be applied to a surface of a hardened cemertitious material using various techniques, such as any of the typical methods used in repair of concrete structures. Exemplary techniques include, but are not limited to, spraying, brooming on, ponding of solutions, low pressure injection, vacuum injection, and the like. The composition can also be applied within cracks or other openings in the cementitious materials, including preexisting cracks or cracks formed by drilling and the like. Low pressure as used herein refers to pressure above atmospheric that is less than the pressure used in concrete removal or "hydrodemolition." The method used to apply the composition to the surface of the cementitious materials is not believed critical, so long as the composition contacts the surface of the structure for time sufficient to allow lithium to penetrate into the structure.

The term "cementitious materials" as used herein includes those cements normally understood in the art to be hydraulic cement, including but not limited to portland cement such as described in ASTM C150 Type I and IA, Type II and IIA, Type III and IIIA, Type IV, and Type V. The term also includes cements blended with ASTM C311 defined pozzolanic materials such as fly ash, raw and calcined natural pozzolans, ASTM C989 defined ground granulated blast furnace slag, ASTM C1240 defined silica fume materials, metakaolin, and the like.

The term "structures" as used herein includes systems containing the above defined cementitious materials, water, aggregate and optionally ASTM C494 defined chemical admixtures such as water reducing, accelerating, retarding admixtures, and other chemical admixtures understood to act as corrosion inhibitors in conventional amounts. Aggregates can include, but are not limited to, natural and crushed quarried aggregate, sand, recycled concrete aggregate, glass, and the like, as well as mixtures thereof. Such systems can be concrete, mortar, grout, and products made therefrom.

The compositions of the invention can effectively penetrate hardened cementitious materials and deliver lithium to regions of the hardened structure beyond the surface to which the composition is applied. Although not wishing to be bound by any explanation of the invention, it is currently believed that the surface active agent reduces surface tension of the liquid solution so that the composition, and thus lithium in the solution, more readily penetrates into the hardened cementitious material. Alternatively, surprisingly, the inventors have found that certain lithium containing materials, such as lithium nitrate, can penetrate into hardened cementitious materials better than other materials without a surface active agent present in the composition. Because of this increased penetration, the compositions and processes of the invention can more effectively minimize ASR in hardened cementitious materials and/or treat ASR-affected cementitious materials.

The lithium containing material is present in the composition in an amount sufficient to treat the detrimental effects of ASR in the cementitious materials (i.e., to minimize ASR and/or remediate existing ASR damage). Generally, lithium containing material is added to the composition in an amount sufficient to provide lithium ion in the composition in an amount from about 0.01 molar to about 15 molar, and preferably about 2 molar to about 8 molar, although concentrations higher and lower can also be used.

The surface active agent can be present in the composition of the invention in an amount sufficient to provide the desired surface tension reducing properties thereto for a particular application, and to improve the penetration or delivery of lithium into hardened cementitious materials. The type and amount of surface active agent can vary depending upon the other components of the compositions, including the source and concentration of lithium, solvent, and the like, as well as the characteristics of the cementitious materials to which the composition is to be applied (such as porosity, chemical composition, and the like). Generally, the surface active agent is added to the composition in an amount sufficient to effectively deliver at least a portion of lithium present in the composition to regions of the cementitious materials beyond the surface of the structure to which the composition is applied. Exemplary compositions can include from about 0.001 weight percent to about 5 weight percent, and preferably about 0.01 to about 1 weight percent, surface active agent, although higher and lower amounts can also be used if effective in a particular application for delivering lithium into the cementitious material.

The compositions can be aqueous based compositions. Alternatively, the compositions of the invention can be, solvent-based compositions including a suitable organic solvent. Suitable organic solvents include, but are not limited to, alkanes, cycloalkanes, aromatic solvents, alcohols, esters, ethers, ketones, amines, and nitrated, halogenated and sulfonated hydrocarbons, and mixtures thereof. Exemplary solvents include alkanes and cycloalkanes containing five to ten carbon atoms, such as pentane, hexane, cyclohexane, methylcyclohexane, heptane, methylcycloheptane, octane, decane and the like, and aromatic solvents containing six to ten carbon atoms such as toluene, ethylbenzene, p-xylene, m-xylene, o-xylene, n-propylbenzene, isopropylbenzene, n-butylbenzene, t-butylbenzene, and the like, and mixtures thereof. Other suitable organic solvents include, but are not limited to, dimethyl sulfoxide (DMSO), diethyl ether, dibutyl ether, tetrahydrofuran (THF), 2-methyltetrahydrofuran, methyl tert-butyl ether, and the like, and mixtures thereof.

In another aspect of the invention, the composition can also include an agent capable of imparting to the composition a viscosity sufficient to hold the composition in place as desired and thus to prevent substantial loss of the composition through the material, i.e., as a result of the composition flowing through cracks, and other openings in the material. Such compositions and advantageously applied to pre-existing cracks or holes and the like in the cementitious materials, for example, resulting from expansion of the concrete due to ASR. The cracks or holes can also be formed in the structure by drilling, and the like.

In this aspect of the invention, the composition can include an agent capable of increasing the viscosity of the composition from a first viscosity during application to a second, increased viscosity after it is applied to the cementitious materials. In effect, "ponding" occurs and the composition is held in place as the viscosity of the composition increases in situ. Exemplary viscosity increasing agents include polymerizable compounds, such as acrylates, methacrylates and epoxies and other polymerizable systems such as those designed around lithium silicate. Other representative viscosity increasing or thickening agents include microcrystalline cellulose and carrageenan. Alternatively, the agent can initially have a high viscosity, such as substantially solid materials or materials having high viscosities.

Concrete and related cementitious systems typically contain a large amount of porosity, mainly attributed to the capillary pores and gel pores. The capillary pores range in size from about 10 nm to about 10 $\mu$m, and the gel pores range in size from about 0.5 nm to about 10 nm. Capillary pores are mostly responsible for the mass exchange between the concrete with its surrounding environment, such as moisture evaporation from the concrete, to the environment. The ingress of moisture from the environment into the concrete happens frequently. This ingress of the moisture into concrete can carry various chemicals with the moisture into the concrete. The chemicals carried into the concrete from the environment often have a detrimental effect on the concrete. The movement of moisture inside of the concrete can also contribute to the internal stress created in the concrete by the ASR.

Lithium has been demonstrated to control ASR-induced expansion in. affected concrete. However, the challenge has remained to utilize this mass exchange so that lithium compounds can effectively penetrate into the concrete. The inventors have provided lithium containing compositions, alternatively with a surface tension reducing agent as a component thereof, which can be effective in introducing lithium into concrete.

In the moist portions of a concrete, fluid movement is diffusion limited; but at the outside surfaces where the concrete is dry, the main type of fluid movement is due to capillary forces.

The ingress of moisture into concrete can be scientifically classified as a solid-liquid interface phenomenon. The phenomenon is primarily related to the capillary action, where the driving force is the function of pore size, contact angle between solid and liquid, and the surface tension of the liquid. It can be expressed as equation I:

$$\Delta P = 2 Y_{LV} \cos \theta / r \qquad (I)$$

wherein $\Delta P$ is the pressure difference across the curved surface of the meniscus, $Y_{LV}$ is the surface tension between the liquid and the vapor phases, θ is the contact angle, and r is the capillary pore radius.

Considerations of the surface free energy at equilibrium lead to the following equality:

$$(Y_{SV} - Y_{SL}) = Y_{LV} \cos \theta$$

Therefore, equation I can be written as equation II:

$$\Delta P = 2(\sigma_{SV} - Y_{SL})/r \qquad (II)$$

wherein $Y_{SV}$ is the surface tension between the solid and the vapor phases and $Y_{SL}$ is the surface tension between the solid and the liquid phases.

The larger the ΔP, the larger the driving force of liquid into concrete. In order to achieve the largest driving force, the goal is to find a surfactant that can reduce $Y_{SL}$ without at the same time reducing $Y_{SV}$.

Because any given surfactant system will affect both interfacial tensions, the best surfactant agents may vary from one system to another system but can be determined for a particular system.

Published data available from 3M Company (and others) for distilled water illustrate that the surface tension of water can be reduced significantly with a variety of surfactants at low concentrations. However, as illustrated in the following examples, the inventors have found that reducing surface tension of a composition does not by itself lead to a composition that will effectively penetrate hardened cementitious materials and deliver lithium into the structure.

The present invention will be further illustrated by the following non-limiting examples.

EXAMPLE 1

Reductions of Surface Tensions for Solutions Containing Lithium Salts

The inventors have found that surface tensions of solutions containing lithium materials may be reduced by adding surfactants or other materials. There are a very large number of surfactants and other materials which can be used in small or large concentrations to reduce significantly surface tensions of solutions. The following examples illustrate how the surface tensions of aqueous solutions containing lithium salts may he reduced.

For illustrative purposes, data in the examples were obtained at room temperature using Fluorad® fluorocarbon surfactants sold commercially by 3M Company as FC-99, FC-129, and FC-430, and a du Nouy ring tensiometer. FC-99 and FC-129 are anionic surfactants, and FC-430 is a non-ionic surfactant. The amount of surfactant: used was 0.2 wt. % active ingredient in every example for comparative purposes only.

In Group 1 of Example 1, lithium hydroxide was used as the base material to make aqueous solutions. Three different surfactants were added at 0.2 wt. % active ingredient to solutions of 9 wt. % lithium hydroxide, and the surface tensions were then measured. For other data in Example 1, the same procedures were used with four other solutions containing lithium materials. The results are set forth in Table 1 below.

TABLE 1

| Group | Lithium Salt in Solution (wt. %) | | Surfactant | Surface Tension (dynes/cm) |
|---|---|---|---|---|
| 1 | Lithium Hydroxide | 9% | none | 72 |
|   |  | 9% | FC-99 | 24 |
|   |  | 9% | FC-129 | 34 |
|   |  | 9% | FC-430 | 26 |
| 2 | Lithium Nitrate | 30% | none | 77 |
|   |  | 30% | FC-99 | 22 |
|   |  | 30% | FC-129 | 25 |
|   |  | 30% | FC-430 | 24 |
| 3 | Lithium Acetate | 32% | none | 72 |
|   |  | 32% | FC-99 | 24 |
|   |  | 32% | FC-129 | 26 |
|   |  | 32% | FC-430 | 34 |
| 4 | Lithium Formate | 15% | none | 69 |
|   |  | 15% | FC-99 | 22 |
|   |  | 15% | FC-129 | 25 |
|   |  | 15% | FC-430 | 28 |
| 5 | Lithium Silicate (4:1 molar $SiO_2$:$Li_2O$) | 22% | none | 72 |
|   |  | 22% | FC-99 | 26 |
|   |  | 22% | FC-129 | 33 |
|   |  | 22% | FC-430 | 26 |

EXAMPLES 2 AND 3

Examples of Increased Penetrations of Liquid Solution by Using Surfactants

One of the characteristics of mortar and concrete is the ability to limit penetration of liquids. However, by selecting liquids and materials to reduce surface tensions, the present invention shows that there can be increased penetrations of liquids.

There are no standard test methods for measuring or comparing penetrations of liquids into mortar or concrete. Penetration depends on many variables, including but not limited to the physical properties of the liquid, interactions of the liquid with mortar or concrete, and properties of the mortar or concrete, such as water/cement ratio at preparation, temperature, and water removed by drying or added by wetting, to name some of the most important. One set of general procedures and experimental techniques for measuring penetrations of liquids was presented by H. W. Reinhardt, "*Transport of Chemicals through Concrete,*" Materials Science of Concrete III; 209–241. In his general procedure, mortar or concrete specimens are cast. A liquid is fed into each cast specimen through a tube by gravity flow. Comparisons are made as to the relative rates or amounts of liquid which flow into each specimen. For Examples 2 and 3 below, surface areas for Liquid penetrations into all cylinders of mortar were all the same. Liquids used in Examples 2 and 3 contained lithium salts approaching the limits of saturation in order to deliver the maximum amount of lithium.

Mortar compositions and characteristics for Examples 2 and 3 are set forth below in Table 2.

TABLE 2

| Batches of Mortar for Examples 2 and 3 | | |
|---|---|---|
| Batch | A | B |
| Example | 2 | 3 |
| Recipe: (lb) | | |
| Cement | 180 | 188 |
| Sand (dry basis) | 479 (approx) | 485 |
| Water (total) | 110 (approx) | 118 |

TABLE 2-continued

Batches of Mortar for Examples 2 and 3

| Batch | A | B |
|---|---|---|
| Example | 2 | 3 |
| Water/cement ratio | 0.61 (approx) | 0.63 |
| Flow (25 drops) | 116 | 120 |
| Unit weight (kg/m$^3$) | 2170 | 2180 |
| Set times | | |
| Initial Hr:Min | 3:50 | 3:20 |
| Final Hr:Min | 5:20 | 4:50 |

Cement: Type I from Blue Circle, approx. 0.2 wt. % alkali
Sand: Fine aggregate, Charlotte, NC, non-reactive, sp. gr.: 2.58, and fineness modulus: 2.50

EXAMPLE 2

Two batches of mortar having the composition shown in Table 2 above were prepared and then cast into several plastic, cylindrical shaped (ASTM) molds which were 6 inches in diameter×12 inches high. A removable rubber plug was quickly inserted into the top of each cylinder of mortar. Each cylinder of mortar was then placed in an individual plastic bag and allowed to cure for at least 28 days at room temperature. Before use, each removable plug was removed and replaced with a special adapter (and held in place with epoxy glue) so the adapter could later receive a tube containing a test liquid. At the beginning of each test, a vertical, flexible tube (5 feet in length×¼ inch outer diameter) containing a test liquid was inserted into the adapter. As a test liquid penetrated into a cylinder of mortar, the height of the test liquid in the tube was recorded as a function of time.

For all liquids, a plot of the volume of liquid vs. square root of time was almost a straight line as predicted by theory. For illustrative and comparative purposes, a time reference of 16 hours was chosen for convenience and to allow clear experimental patterns to develop adequately. The results are set forth in Table 3 below. The column labeled "mL" sets forth the volume of liquid solution delivered into the mortar sample after 16 hours.

TABLE 3

| Group | Liquid Solution | Surface Tension (dynes/cm) | mL | Lithium Delivered (mg) |
|---|---|---|---|---|
| I | Water | 73 | 7.2 | — |
|   | Water + FC-99 | 25 | 7.0 | — |
| II | 30 wt. % LiNO$_3$ | 77 | 5.6 | 205 |
|    | 30 wt. % LiNO$_3$ + FC-99 | 22 | 8.3 | 305 |
|    | 15 wt. % LiNO$_3$ + FC-99 | 21 | 9.5 | 174 |
|    | 30 wt. % LiNO$_3$ + FC-430 | 24 | 3.0 | 110 |
|    | 30 wt. % LiNO$_3$ + FC-135 | 25 | 2.6 | 95 |
| III | 27 wt. % Li acetate | 72 | 6.5 | 207 |
|     | 27 wt. % Li acetate + FC-430 | 34 | 7.7 | 245 |
| IV | 15 wt. % Li formate | 69 | 8.4 | 182 |
|    | 15 wt. % Li formate + FC-99 | 22 | 8.5 | 184 |
| V | 9 wt. % LiOH | 72 | 3.7 | 107 |
|   | 9 wt. % LiOH + FC-135 | 23 | 4.0 | 115 |
| VI | 22 wt. % LiSiO$_2$ (4:1) | 72 | 0.3 | 4 |
|    | 22 wt. % LiSiO$_2$ (4:1) + FC-99 | 26 | 0.5 | 7 |
| VII | DMSO (neat) | 47 | 10.5 | — |
|     | 20 wt. % LiNO$_3$ in DMSO | 57 | 2.8 | 70 |
|     | 20 wt. % LiNO$_3$ in DMSO + FC-99 | 30 | 3.5 | 88 |

Notes:
1. All "FC" surfactants from 3M and 0.2 wt. % (active)
2. All volumes are for single measurements after 16 hours except that the data for 30 wt. % LiNO$_3$ + FC-99 is an average of two tests.

From the results of Example 2, the following observations were made:
1. Surface tensions of these aqueous solutions with 0.2 wt. % active surfactant were all reduced to approximately 21–34 dynes/cm from 69–77 dynes/cm surfactant.
2. There was an increase in the amount of liquid penetrating into the mortar for most, but not all, base lithium materials when an agent to reduce surface tension was added to the liquid.
3. For test materials containing lithium, an aqueous lithium nitrate solution with an anionic surfactant achieved the greatest penetration of lithium.
4. Liquids containing lithium hydroxide and lithium silicate were expected to penetrate slower into mortar than water because of reactions with mortar. These tests verified those expectations. However, in both cases, penetration rates increased by adding a surfactant.
5. A polar organic material, dimethyl sulfoxide (neat), penetrated a mortar specimen faster than any aqueous liquids in these tests. However, the penetration rate decreased significantly when 20 wt. % lithium nitrate was added. In this portion of the example, a surfactant (which was arbitrarily picked from a group of surfactants tested in other prior tests) also caused increased penetration.

EXAMPLE 3

In Example 3, three liquid solutions were allowed to penetrate into cylinders as in Example 2. Cylinders in Example 3 were intended to be the same as in Example 2 but were slightly different due to experimental conditions. Results show that aqueous solutions of LiNO$_3$ penetrated faster than solutions of the LiNO$_2$ solution. An anionic surfactant also increased the penetration rate for LiNO$_2$. (The amounts of liquid penetrating into mortar batch B after 16 hours was lower for batch B specimens than for batch A primarily because of a different technique of inserting the removable plugs into each cylinder while mortar was setting.) The results are set forth in Table 4 below. The column labeled "mL" sets forth the volume of liquid solution delivered to the mortar sample and is the average volume of two tests after 16 hours.

TABLE 4

| Liquid Solution | Surface Tension (dynes/cm) | mL | Lithium Delivered (mg) |
|---|---|---|---|
| 30 wt. % LiNO$_3$ + FC-99 | 22 | 3.8 | 139 |
| 28 wt. % LiNO$_2$ | 55 | 1.7 | 80 |
| 28 wt. % LiNO$_2$ + FC-99 | 24 | 2.2 | 104 |

The foregoing examples are illustrative of the present invention and are not to be construed as limiting thereof.

That which is claimed is:

1. A composition for treating hardened cementitious materials to control damage to cementitious materials as a result of alkali-silica reaction (ASR), comprising at least one lithium containing material, with the proviso that said lithium containing material is not lithium silicate, and at least one surface tension reducing agent, wherein said composition delivers lithium beyond the surface of said hardened cementitious material.

2. The composition of claim 1, wherein said lithium containing material is selected from the group consisting of organic and inorganic lithium salts, organolithiums, and mixtures thereof.

3. The composition of claim 2, wherein said lithium containing material is selected from the group consisting of lithium nitrate, lithium sulfate, lithium citrate, lithium formate, lithium borate, lithium acetate, lithium meta or tetraborate, lithium benzoate, lithium salts of simple carboxylic acids, lithium halides, lithium hydroxide, lithium nitrite, methyllithium, butyllithium, phenyllithium, lithium hydroxyethoxide, lithium amide, lithium ortho- and metaphosphate, lithium aluminate, and mixtures thereof.

4. The composition of claim 1, wherein said lithium containing material is an organic or inorganic lithium salt or a mixture thereof.

5. The composition of claim 4, wherein said lithium containing material is lithium nitrate.

6. The composition of claim 1, wherein said surface tension reducing agent is a surface active agent.

7. The composition of claim 6, wherein said surface active agent is selected from the group consisting of cationic, anionic, nonionic, and amphoteric surfactants, and mixtures thereof.

8. The composition of claim 7, wherein said surfactant is an anionic surfactant.

9. A composition for treating hardened cementitious materials to control damage to cementitious materials as a result of alkali-silica reaction (ASR), comprising at least one organic or inorganic lithium salt or a mixture thereof, with the proviso that the lithium salt is not lithium silicate, and at least one anionic surfactant or a mixture thereof, wherein said composition delivers lithium beyond the surface of said hardened cementitious material.

10. The composition of claim 9, wherein said composition comprises lithium in an amount of about 0.01 molar to about 15 molar and surfactant in an amount of about 0.001 weight percent to about 5 weight percent.

11. The composition of claim 9, wherein said composition comprises lithium nitrate and an anionic fluorocarbon surfactant.

12. A composition for treating hardened cementitious materials to control damage to cementitious materials as a result of alkali-silica reaction (ASR), comprising lithium nitrate and at least one anionic fluorocarbon surfactant or a mixture thereof, wherein said composition delivers lithium beyond the surface of said hardened cementitious material.

13. A composition for remedially treating hardened cementitious materials to control damage to cementitious materials as a result of alkali-silica reaction (ASR), comprising at least one lithium containing material, with the proviso that said lithium containing material is not lithium silicate; at least one surface tension reducing agent; and at least one agent imparting to the composition a viscosity sufficient to prevent substantial loss of the composition through cavities in the cementitious material.

14. The composition of claim 13, wherein said viscosity imparting agent is a polymerizable compound, said polymerizable compound polymerizing in situ to increase the viscosity of the composition.

15. The composition of claim 14, wherein said polymerizable compound is selected from the group consisting of acrylates, methacrylates and epoxies.

16. The composition of claim 13, wherein said viscosity imparting agent is selected from the group consisting of microcrystalline cellulose and carrageenan.

* * * * *

UNITED STATES PATENT AND TRADEMARK OFFICE
CERTIFICATE OF CORRECTION

PATENT NO. : 5,985,011
DATED : November 16, 1999
INVENTOR(S) : Foltz et al.

It is certified that error appears in the above-identified patent and that said Letters Patent is hereby corrected as shown below:

Column 6, line 65, "$\Delta P = 2Y_{LV} COS\ \theta/r$" should read --$\Delta P = 2\Upsilon_{LV} COS\ \theta/r$--.

Column 6, line 67, "$Y_{LV}$" should read --$\Upsilon_{LV}$--.

Column 7, line 6, "$(Y_{SV} - Y_{SL}) = Y_{LV} COS\ \theta$" should read --$(\Upsilon_{SV} - \Upsilon_{SL}) = \Upsilon_{LV} COS\ \theta$--.

Column 7, line 9, "$\Delta P = 2(\sigma_{SV} - Y_{SL})/r$" should read --$\Delta P = 2(\Upsilon_{SV} - \Upsilon_{SL})/r$--.

Column 7, line 12, "$Y_{SV}$" should read --$\Upsilon_{SV}$--.

Column 7, line 13, "$Y_{SL}$" should read --$\Upsilon_{SL}$--.

Column 7, line 18, "$Y_{SV}$" should read --$\Upsilon_{SV}$--.

Signed and Sealed this

Fifth Day of September, 2000

Attest:

*Attesting Officer*

Q. TODD DICKINSON

*Director of Patents and Trademarks*